(12) United States Patent
Ono et al.

(10) Patent No.: US 8,955,223 B2
(45) Date of Patent: Feb. 17, 2015

(54) METHOD OF MANUFACTURING LIQUID EJECTION HEAD

(71) Applicant: Canon Kabushiki Kaisha, Tokyo (JP)

(72) Inventors: Takayuki Ono, Kawasaki (JP); Shimpei Otaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 13/681,829

(22) Filed: Nov. 20, 2012

(65) Prior Publication Data

US 2013/0139944 A1   Jun. 6, 2013

(30) Foreign Application Priority Data

Dec. 5, 2011   (JP) ................. 2011-265968

(51) Int. Cl.
| | | |
|---|---|---|
| *B21D 53/76* | (2006.01) | |
| *B23P 17/00* | (2006.01) | |
| *B41J 2/015* | (2006.01) | |
| *B41J 2/135* | (2006.01) | |
| *B32B 37/12* | (2006.01) | |
| *B41J 2/16* | (2006.01) | |
| *B41J 2/14* | (2006.01) | |

(52) U.S. Cl.
CPC .............. *B32B 37/12* (2013.01); *B41J 2/1603* (2013.01); *B41J 2/1623* (2013.01); *B41J 2002/14362* (2013.01)
USPC ................. 29/890.1; 347/20; 347/44; 347/45

(58) Field of Classification Search
USPC .................. 29/890.1; 347/20, 44, 45
See application file for complete search history.

(56) References Cited

U.S. PATENT DOCUMENTS

| | | | | |
|---|---|---|---|---|
| 4,994,825 | A * | 2/1991 | Saito et al. ..................... 347/63 |
| 6,895,668 | B2 * | 5/2005 | Imamura ..................... 29/890.1 |
| 7,340,831 | B2 * | 3/2008 | Yamaguchi et al. ......... 29/890.1 |
| 7,757,398 | B2 * | 7/2010 | Hori ............................. 29/890.1 |
| 2011/0057992 | A1 * | 3/2011 | Tobita et al. .................... 347/54 |
| 2011/0063348 | A1 * | 3/2011 | Mita ............................. 347/9 |
| 2011/0221820 | A1 * | 9/2011 | Shibata ......................... 347/17 |
| 2011/0242217 | A1 * | 10/2011 | Hiraide ......................... 347/45 |
| 2012/0098896 | A1 * | 4/2012 | Nihei ............................. 347/68 |
| 2013/0111753 | A1 * | 5/2013 | Nihei ........................... 29/890.1 |

FOREIGN PATENT DOCUMENTS

| | | | |
|---|---|---|---|
| JP | 10-100419 A | | 4/1998 |
| JP | 10100419 | * | 4/1998 |
| JP | 2007-223173 A | | 9/2007 |
| JP | 2007223173 | * | 9/2007 |

* cited by examiner

*Primary Examiner* — David Angwin
(74) *Attorney, Agent, or Firm* — Fitzpatrick, Cella, Harper & Scinto

(57) ABSTRACT

A liquid adhesive is applied onto a surface of a base plate having flow channels formed as recesses or through-grooves, by transferring the liquid adhesive from a rotating cylinder coated with it to the surface of the base plate. The base plate is then bonded to a cover plate having ejection energy generating elements via the applied adhesive to be made into a liquid ejection head. For evenly applying the liquid adhesive onto the surface having the recesses or through-grooves as flow channels, the surface is additionally provided with dummy recesses for compensating for variance of contact length orthogonal to the transfer direction due to uneven or asymmetrical arrangement of the recesses or through-grooves.

10 Claims, 8 Drawing Sheets

METHOD OF MANUFACTURING LIQUID EJECTION HEAD

BACKGROUND OF THE INVENTION

1. Field of the Invention

The present invention relates to a method of manufacturing a liquid ejection head for ejecting liquid such as ink.

2. Description of the Related Art

Liquid ejection heads are generally manufactured by laying the second substrate that operates as a cover plate having liquid ejection ports on the first substrate that operates as a base plate having a liquid supply port including apertures and grooves by way of an adhesive agent. For this reason, a step of continuously applying a liquid material such as an adhesive agent on the surface of the first substrate with a predetermined width is required for manufacturing liquid ejection heads.

When applying a liquid material such as an adhesive agent continuously on the surface of the first substrate with a predetermined width, liquid of the above described type is more often than not applied in advance to the surface of a cylindrical member and then transferred onto the first substrate. However, this technique is accompanied by problems as will be specifically described below.

FIG. 8A illustrates an exemplar first substrate that has a surface representing an asymmetric layout relative to center line M of a belt-shaped transfer region having a predetermined width W onto which transfer liquid is to be continuously applied. The first substrate 102 that operates as transfer medium has a plurality of grooves 101 for forming a supply port and the plurality of grooves 101 are arranged asymmetrically relative to the center line M of the belt-shaped transfer region having the predetermined width W.

Then, transfer liquid is continuously transferred onto the first substrate 102 in a transfer direction with a predetermined width as illustrated in FIG. 8B. More specifically, a predetermined quantity of transfer liquid 105 has been applied onto the surface of transfer body 103 and the transfer liquid 105 that has been applied onto the surface of the transfer body 103 is then continuously applied onto the first substrate 102 with the predetermined width while the transfer body 103 is pressing the first substrate 102 with predetermined load F.

Under this condition, the pressing force F pressing the transfer liquid 105 acts evenly and uniformly in the short-side direction of the first substrate 102 in the cross section taken along line 9A-9A of the first substrate 102 because no grooves 101 are formed there as illustrated in FIG. 9A.

On the other hand, grooves 101 are formed in the cross section taken along line 9B-9B of the first substrate 102 as illustrated in FIG. 9B. Therefore, the load F that presses the transfer liquid 105 does not act evenly and uniformly on the first substrate 102 and the pressure in the grooves 101 rises. Thus, the first substrate 102 can be inclined as illustrated in FIG. 9C when the force holding the first substrate 102 is weak. Then, as a result, there can arise a problem that no transfer liquid 105 is transferred onto the first substrate 102 at the side thereof that is held apart from the transfer body 103.

When the force holding the first substrate 102 is even and uniform, the first substrate 102 dips deeper into the transfer liquid 105 in the cross section taken along line 9D-9D as illustrated in FIG. 9D if compared with the cross section 9A-9A where no grooves 101 are formed. Then, as a result, there can arise a problem that transfer liquid 105 adheres to the inner walls of the grooves 101.

Thus, when the first substrate 102 has grooves 101 extending in a transfer direction in which transfer liquid 105 is to be continuously applied, the pressing force that acts on the transfer liquid 105 that exists between the first substrate 102 and the transfer body 103 varies as a function of the number of grooves 101. Then, as a result, transfer liquid 105 cannot be applied under the same transfer conditions over the entire surface of the first substrate 102.

Additionally, the pressing force acting on the transfer liquid 105 in the protruding portions in the regions where grooves 101 are formed is greater than the pressing force in the flat regions where no grooves 101 are formed so that the transfer liquid 105 is encouraged to enter deep into the grooves 101 to consequently give rise to a defective transfer of the liquid.

For the above identified reasons, techniques as disclosed in Japanese Patent Applications Laid-Open Nos. 2007-223173 and H10-100419 and described below have been and being employed when continuously applying liquid onto a transfer medium with a predetermined width.

(1) When the transfer medium has a surface representing a symmetric layout relative to the center line of the transfer width thereof, a technique of keeping the transfer pressure applied to the transfer medium in the transfer region to be even and uniform by making the pressure acting on the transfer body (roller or squeegee) operating for a continuous liquid transfer variable so as to be responsive to the surface layout of the transfer medium can be employed.

(2) When the transfer medium has a surface representing an asymmetric layout relative to the center line of the transfer width thereof, a technique of keeping the transfer pressure to be even and uniform by arranging separate transfer mediums onto which transfer liquid is to be applied continuously at the respective opposite sides relative to the center line of the overall transfer width and making the pressures acting on the respective transform mediums variable so as to be responsive to the surface layouts of the transfer mediums can be employed.

(3) When the transfer medium has a surface representing an asymmetric layout relative to the center line of the transfer width thereof, a technique of writing with liquid on a transfer medium by means of a dispenser in a manner responsive to the surface layout of the transfer medium can be employed.

However, the technique of (1) described above has a disadvantage that it can be employed only when the surface layout of a transfer medium is transversally symmetric and the technique of (2) described above has a disadvantage of requiring the use of separate transfer bodies at the opposite sides relative to the center line of the overall transfer width, while the technique of (3) described above has a disadvantage of requiring a long time for the step of applying liquid to a transfer medium, although it provides an advantage of being applicable to transfer mediums having a complex surface layout. Therefore, the object of the present invention is to provide a method of manufacturing a liquid ejection head by using a technique that is free from the above disadvantages and very suited for continuously applying a liquid material such as an adhesive agent to the first substrate of a liquid ejection head that operates as base plate with a predetermined width.

SUMMARY OF THE INVENTION

According to the present invention, there is provided a method of manufacturing a liquid ejection head including the steps of: preparing a first substrate having a surface provided with flow channels for supplying liquid formed as recesses or through-grooves and a second substrate provided with energy generating elements for generating energy to be utilized to eject liquid; transferring transfer liquid onto the surface of the first substrate in a predetermined direction by means of a roller-shaped transfer body; and bonding the first substrate and the second substrate together by way of the transfer liquid; the transfer body contacting the first substrate substantially by a same and equal distance by way of the transfer liquid in a direction orthogonal relative to the predetermined direction in the step of transferring transfer liquid.

According to the present invention, there is also provided a method of manufacturing a liquid ejection head including the steps of: preparing a first substrate having a surface provided with flow channels for supplying liquid formed as recesses or through-grooves and adjusting sections formed as recesses or through-grooves not to be used for supplying liquid and a second substrate provided with energy generating elements for generating energy to be utilized to eject liquid; transferring transfer liquid onto the surface of the first substrate in a predetermined direction by means of a roller-shaped transfer body; and bonding the first substrate and the second substrate together by way of the transfer liquid; the flow channels and the adjusting sections being arranged on the surface of the first substrate in juxtaposition in a direction orthogonal relative to the predetermined direction.

Further features of the present invention will become apparent from the following description of exemplary embodiments with reference to the attached drawings.

DESCRIPTION OF THE EMBODIMENTS

Now, embodiments of the present invention will be described in greater detail by referring to the accompanying drawings.

More specifically, the embodiments of method of manufacturing a liquid ejection head that can maintain a state of evenly and uniformly transferring liquid at any position on the first substrate thereof as viewed in the transfer direction in an operation of continuously transferring transfer liquid onto the first substrate, which is a transfer medium, with a predetermined width will be described below.

(First Embodiment)

Figure 1:
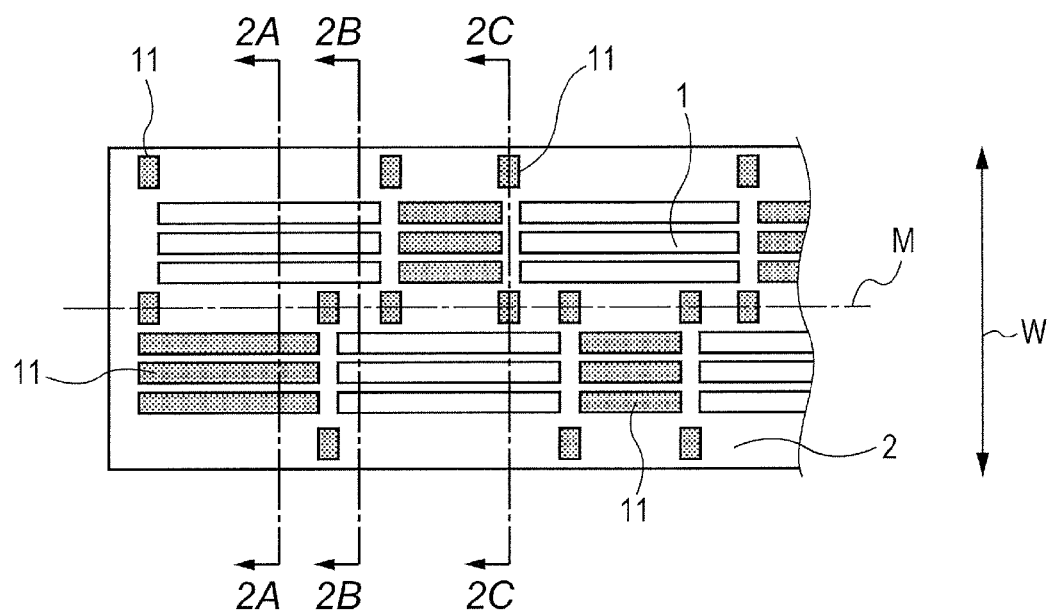
FIG. 1 is a schematic plan view of a first substrate according to the first embodiment of the present invention, illustrating the surface layout thereof.

FIG. 1 is a schematic plan view of a first substrate according to the first embodiment. As seen from FIG. 1, the method of manufacturing a liquid ejection head according to the present embodiment has a step of continuously transferring transfer liquid onto the rectangular first substrate 2, which has flow channels including recesses or through-grooves 11, in a transfer direction with a predetermined width by means of a roller-shaped transfer body. With this embodiment, after applying the transfer liquid onto the first substrate 2, a second substrate having energy generating elements for providing liquid such as ink with energy is bonded onto the first substrate 2 by way of the transfer liquid.

As illustrated in FIG. 1, the first substrate 2 carries a plurality of rectangular grooves 1 formed thereon. Additionally, the first substrate 2 also carries a plurality of surface area adjusting recesses 11 formed thereon to reduce the surface area of the first substrate 2.

Figure 2A:
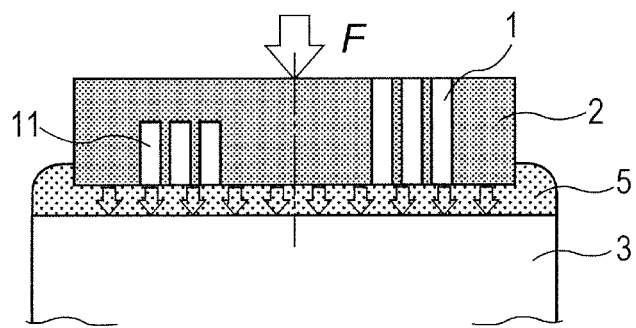
FIGS. 2A, 2B and 2C are schematic cross-sectional views respectively taken along line 2A-2A, line 2B-2B and line 2C-2C in FIG. 1, illustrating the first substrate of FIG. 1, a transfer body and transfer liquid in a state of being transferred.
Figure 2B:
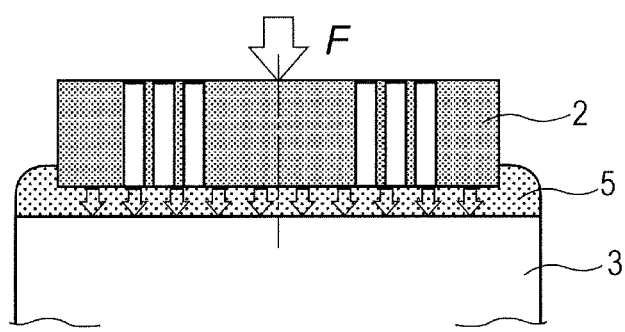
Figure 2C:
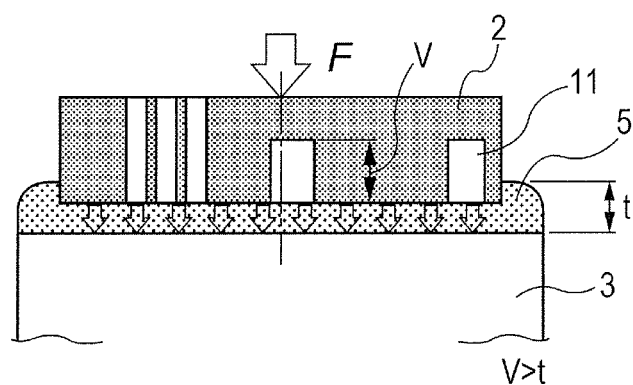

FIGS. 2A, 2B and 2C are schematic cross-sectional views respectively taken along line 2A-2A, line 2B-2B and line 2C-2C in FIG. 1. In FIGS. 2A through 2C, V denotes the depth of the surface area adjusting recesses 11 and t denotes the thickness of the transfer liquid 5 applied onto the peripheral surface of a roller-shaped transfer body 3 with even and uniform thickness.

As illustrated in FIG. 1, the grooves 1 are formed in groups that are arranged in a zigzag manner. Groups of the grooves 1 are one-sided in the cross sections respectively taken along lines 2A-2A and 2C-2C in FIG. 1 running in the short-side direction W that are orthogonal relative to the transfer direction of the first substrate 2. On the other hand, two groups of grooves 1 are arranged at the opposite sides in the cross section taken along line 2B-2B running in the short-side direction W.

Thus, with such an arrangement, the cross sections taken sequentially in the transfer direction of continuously transferring the transfer liquid 5 differ from each other in terms of number and the manner of arrangement of the grooves 1 formed on the first substrate 2. Therefore, the force pressing the transfer liquid at the time of transfer varies from a cross section to another.

For this reason, with this embodiment, the surface area adjusting recesses 11 are provided in groups on each of the cross sections of the first substrate 2. The width (the length in a direction orthogonal relative to the transfer direction) of each surface area adjusting recess 11 in a cross section is so selected as to compensate for the difference between the cross section and a cross section where the predetermined width of the transfer region less the sum of the widths of the group of the grooves 1 in the latter cross section is smallest.

With this embodiment, the ratio of the grooves 1 (the sum of the widths of the grooves) is largest in the cross section (2B-2B cross section) taken along line 2B-2B and hence the sum of the widths of the surface area adjusting recesses 11 in any related cross section is made equal to the difference between the sum of the widths of the grooves 1 in that cross section and the sum of the widths of the grooves 1 in the 2B-2B cross section.

Then, with this embodiment, the second substrate (not illustrated) having energy generating elements is arranged in a latter step on the surface of the first substrate 2 where the grooves 1 are formed.

The periphery of each of the grooves 1 needs to be covered by the transfer liquid 5 in order to supply liquid to the second substrate having energy generating elements for the purpose of providing the liquid with energy. When the surface area adjusting recesses 11 are arranged near the opposite lateral edges of the first substrate 2 as viewed in the short-side direction of the rectangular grooves 1, the transferred liquid 5 may not adhere satisfactorily to the rear surface of the second substrate having energy generating elements. Then, the peripheries of the grooves 1 may not be covered by the transferred liquid 5.

If such is the case, the surface area adjusting recesses 11 having a desired width are arranged at positions located near the four corners of each group of grooves 1 but sufficiently separated from the periphery of the group as illustrated in FIG. 1. With this arrangement, the contact length of the first substrate 2 by which the first substrate 2 contacts with the transfer body in any cross section can be made equal to the contact length of the first substrate 2 in the cross section taken along line 2A-2A.

Thus, with this embodiment, the sum of the widths of the grooves 1 and those of the recesses 11 can be made to represent a same value for all transversal cross sections of the first substrate 2. In other words, all cross sections of the first substrate 2 that are transversal relative to the transfer direction represent a same length of contact (contact length) by which the first substrate 2 contacts the transfer body 3 through the transfer liquid 5. Then, as a result, when the first substrate 2 is subjected to constant load F so as to be pressed against the transfer liquid 5 that has been applied to the peripheral surface of the transfer body 3 to a constant thickness as illustrated in FIGS. 2A through 2C, the pressing force (transfer pressure) will be same for all cross sections.

Note that the surface area adjusting recesses 11 are preferably arranged as symmetrical counterparts of the grooves 1 relative to the center line of the first substrate 2 as viewed in the moving direction of the transfer body 3.

However, there may be instances where the surface area adjusting recess 11 cannot be arranged as symmetrical counterparts of the grooves 1 depending on the arrangement of the grooves 1. Then, the surface area adjusting recesses 11 are preferably arranged as substantially symmetrical counterparts of the grooves 1.

When the first substrate 2 is pushed by applying constant load F at the time of transferring the transfer liquid 5 from the surface of the transfer body 3, the transfer liquid 5 is pressed to reduce its thickness. If some of the pressed transfer liquid 5 consequently gets into the surface area adjusting recesses 11 to fill the insides of the surface area adjusting recesses 11, a situation where the surface area adjusting recesses 11 are practically non-existent may arise. Then, as a result, the contact area between the first substrate 2 and the transfer liquid 5 changes to by turn change the pressing force that has been applied to the first substrate 2 over a predetermined width.

Note, however, that the amount by which the thickness of the transfer liquid 5 is reduced by the predetermined load F may vary depending on the material factors of the transfer liquid 5 such as viscosity and the conditions of the device being operated to transfer liquid such as the condition in which the predetermined load F is applied. Thus, for the purpose of avoiding a situation where the surface area adjusting recesses 11 are filled with the transfer liquid 5, the depth V of the surface area adjusting recesses 11 is preferably greater than the application thickness t of the transfer liquid 5 applied onto the transfer body 3 to a constant thickness.

Thus, with this embodiment, the length by which the first substrate 2 contacts the transfer body 3 by way of the transfer liquid 5 (contact length) is made to represent a same value for all cross sections of the first substrate 2. Then, as a result, the transfer pressure that is applied to the first substrate 2 by way of the transfer liquid 5 at the time of transfer can be held to a same level over the entire transfer region where the transfer body 3 contacts the first substrate 2. Then, as a result, the transfer liquid 5 can be transferred stably over the entire transfer region.

(Second Embodiment)

Figure 3A:
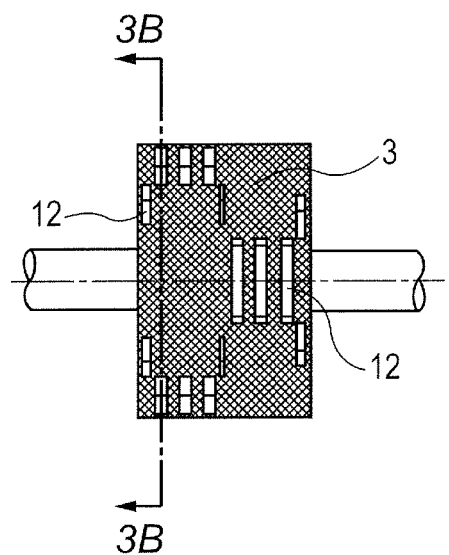
FIGS. 3A and 3B respectively schematically illustrate the surface layout and a cross-sectional view of a transfer body according to the second embodiment, and FIG. 3C schematically illustrates how transfer liquid is transferred onto a first substrate by means of the transfer body.
Figure 3B:
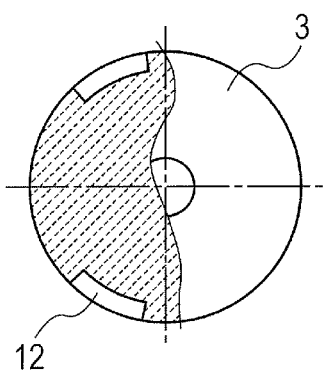
Figure 3C:
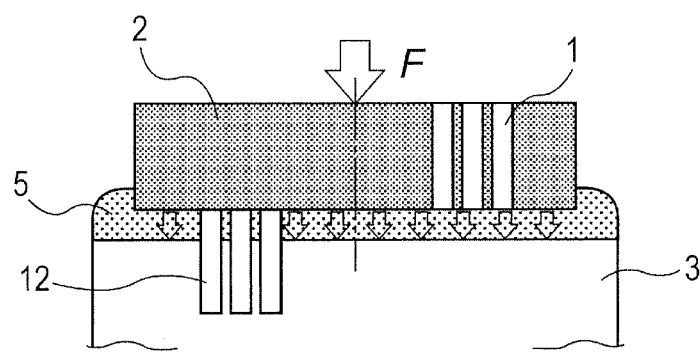

Now, the second embodiment of the present invention will be described below by referring to FIGS. 3A through 3C. FIG. 3A is a schematic side view of a first substrate and FIG. 3B is a schematic cross-sectional view of a transfer body, taken along line 3B-3B. FIG. 3C is a schematic cross-sectional view of the first substrate 2 and the transfer body 3, illustrating a situation where transfer liquid is being transferred by the transfer body.

As illustrated in FIGS. 3A through 3C, the transfer body 3 is provided with surface area adjusting recesses 12 for reducing the surface area of the transfer body 3 and transfer liquid 5 is applied to the peripheral surface of the transfer body 3.

There may be instances where the first substrate 2 can be provided with the surface area adjusting recesses 11 with difficulty because the flat area of the surface of the first substrate 2 that is free from the grooves 1 is relatively small unlike the instances described above for the first embodiment. If such is the case, the second embodiment can produce an effect similar to that of the first embodiment by arranging the surface area adjusting recesses 12 on the transfer body 3 as illustrated in FIGS. 3A and 3B.

With regard to continuously transferring the transfer liquid 5, the first substrate 2 has cross sections where the width of the first substrate 2 less sum of the widths of the grooves 1 located there is smallest (the smallest width cross sections). The surface area adjusting recesses 12 that are formed on the surface of the transfer body are arranged such that the contact length of the first substrate 2 in any cross section is equal to the contact length of the first substrate 2 in the smallest width cross sections. The surface area adjusting recesses 12 are arranged in areas of the peripheral surface of the transfer body 3 other than the areas that correspond to the grooves 1 formed on the first substrate 2.

FIG. 3C illustrates the state of the first substrate 2, that of the transfer body 3, that of the transfer liquid 5 and that of the surface area adjusting recesses 12 in a cross section that can be observed at the time of transferring liquid with this embodiment. As illustrated in FIG. 3C, the surface area adjusting recesses 12 are preferably arranged as symmetrical counterparts of the grooves 1 relative to the transfer direction of the first substrate 2.

If the surface area adjusting recesses 12 cannot be arranged as symmetrical counterparts of the grooves 1 relative to the center line M orthogonal to the short-side direction W depending on the arranged positions of the grooves 1 on the first substrate 2. Then, the surface area adjusting recesses 12 are preferably arranged as symmetrically as possible relative to the grooves 1. As the surface area adjusting recesses 12 are arranged as substantially symmetrical counterparts of the grooves 1, load F that acts on the first substrate 2 is evenly and uniformly applied to the first substrate 2 when the transfer liquid 5 is pressed. Then, as a result, the transfer liquid 5 can be transferred stably over the entire transfer region.

Figure 4:
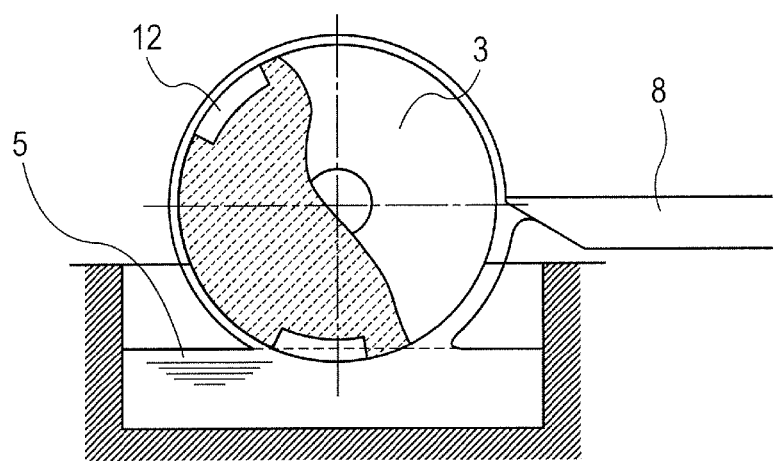
FIG. 4 is a schematic cross-sectional view of the transfer body according to the second embodiment, illustrating the technique of applying transfer liquid onto the transfer body.

FIG. 4 is a schematic cross-sectional view of a transfer body 3 that can be used with this embodiment, illustrating a state where the transfer liquid 5 is being applied to the surface of the transfer body 3. As illustrated in FIG. 4, a squeegee 8 may be used to adjust the thickness of the transfer liquid 5 being applied to the transfer body 3.

As illustrated in FIG. 4, the transfer liquid 5 is applied to the peripheral surface of the transfer body 3 by partly immersing the transfer body 3 into the transfer liquid 5 put in a container and driving the transfer body 3 to rotate counterclockwise in FIG. 4.

Subsequently, the excessive transfer liquid 5 applied to the transfer body 3 is removed by adjusting in advance the gap between the squeegee 8 and the transfer body 3 so that the transfer liquid 5 is applied onto the transfer body 3 to a desired thickness. The transfer body 3 is partly immersed into the transfer liquid 5 preferably such that the surface area adjusting recesses 12 are not completely filled with the transfer liquid 5.

(Third Embodiment)

Figure 5A:
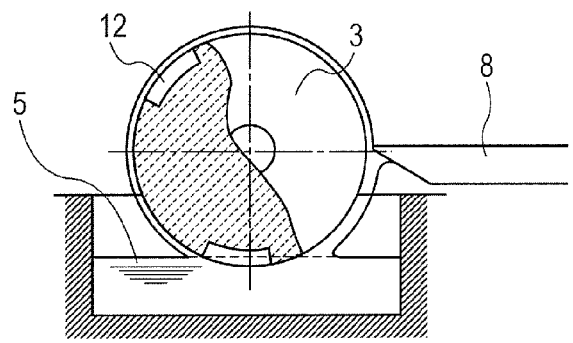
FIGS. 5A, 5B and 5C schematically illustrate the technique of transferring liquid according to the third embodiment.
Figure 5B:
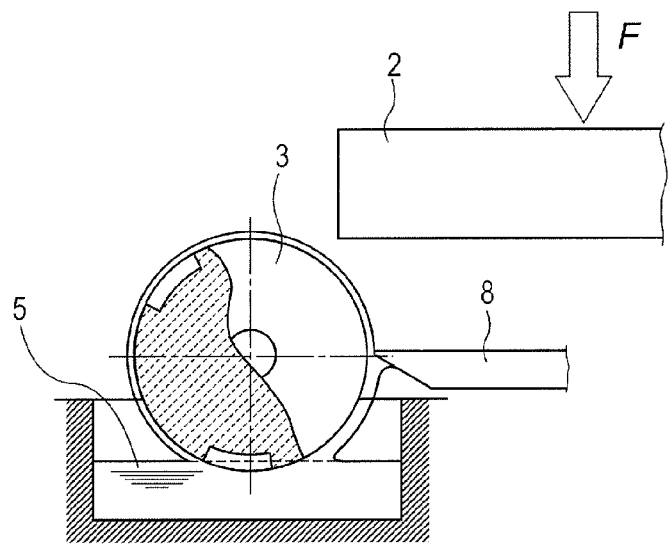
Figure 5C:
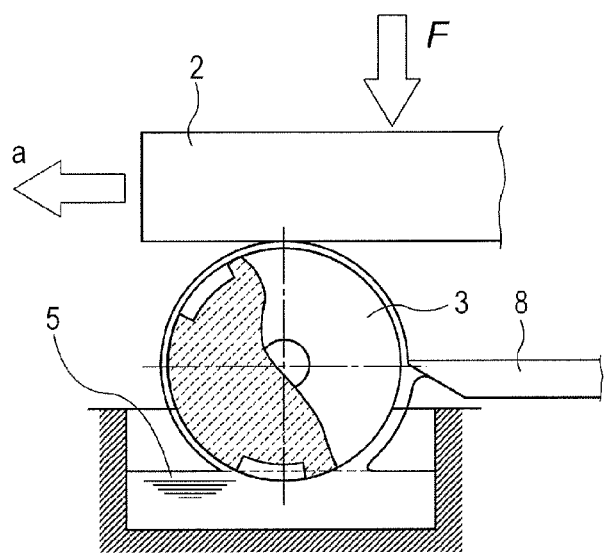

Now, the third embodiment of the present invention will be described below. FIGS. 5A through 5C schematically illustrate the technique of transferring transfer liquid that can be used with this embodiment.

As illustrated in FIG. 5A, transfer liquid 5 is applied in advance to the peripheral surface of a transfer body 3 to a desired thickness. Subsequently, as illustrated in FIG. 5B, a first substrate 2 is arranged in position with the transfer surface thereof to which the transfer liquid 5 is to be transferred facing vertically downward. At this time, as for the vertical positional relationship between the first substrate 2 and the transfer body 3, the transfer surface of the first substrate 2 is preferably located vertically below the highest position of the peripheral surface of the transfer body 3 without fail, considering possible variances in the thickness and/or the warp of the first substrate 2.

Then, the first substrate 2 is pressed by a press mechanism (not illustrated) that applies constant load F to the transfer body 3.

Then, as illustrated in FIG. 5C, the transfer surface of the first substrate 2 moves on the transfer body as the first substrate 2 is driven to move in the direction of arrow a in FIG. 5C. At this time, the transfer body 3 is driven to rotate counterclockwise in FIG. 5C as the first substrate 2 moves so that the transfer liquid 5 is continuously supplied to the peripheral surface of the transfer body 3.

Additionally, the first substrate 2 is so supported as to be movable in the direction opposite to the direction in which the constant load F acts. Therefore, if variances arise in the thickness and/or the warp of the first substrate 2, the first substrate 2 is so supported as to escape in the direction opposite to the direction in which the constant load F acts if reaction force greater than the constant load F occurs.

Now, a liquid ejection head manufactured by the above described method of manufacturing a liquid ejection head will be described below.

Figure 6:
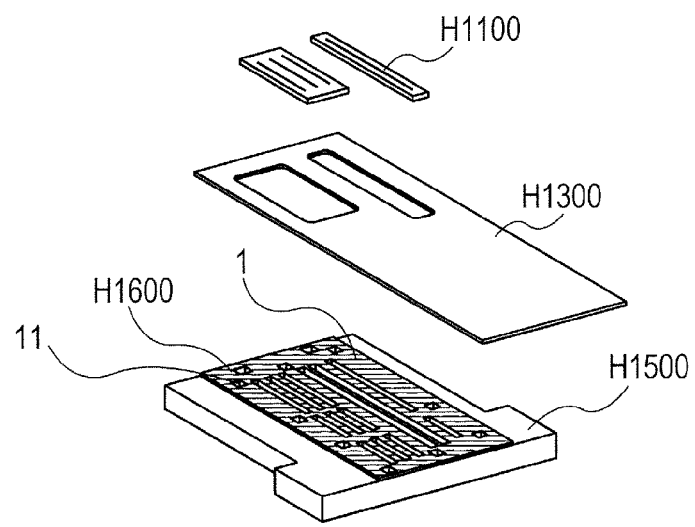
FIG. 6 is a schematic perspective view of a liquid ejection head manufactured by a method according to the present invention.

All liquid ejection heads that can be manufactured by the method of the present invention are those of the bubble jet (registered trade name) type that employ electro-thermal conversion elements that generates thermal energy to give rise to film boiling in liquid according to an electric signal, and also those of the so-called side shooter type where electro-thermal conversion elements and ejection ports are oppositely arranged (1) Liquid Ejection Head FIG. 6 is an exploded schematic perspective view of a liquid ejection head. Referring to FIG. 6, the liquid ejection head includes a base plate H1500 that is a first substrate, an element substrate H1100 that is a second substrate having energy generating elements, a flexible wiring member H1300 and an adhesive agent H1600 that is transfer liquid.

(1-1) Substrate H1100 Having Energy Generating Elements

Figure 7:
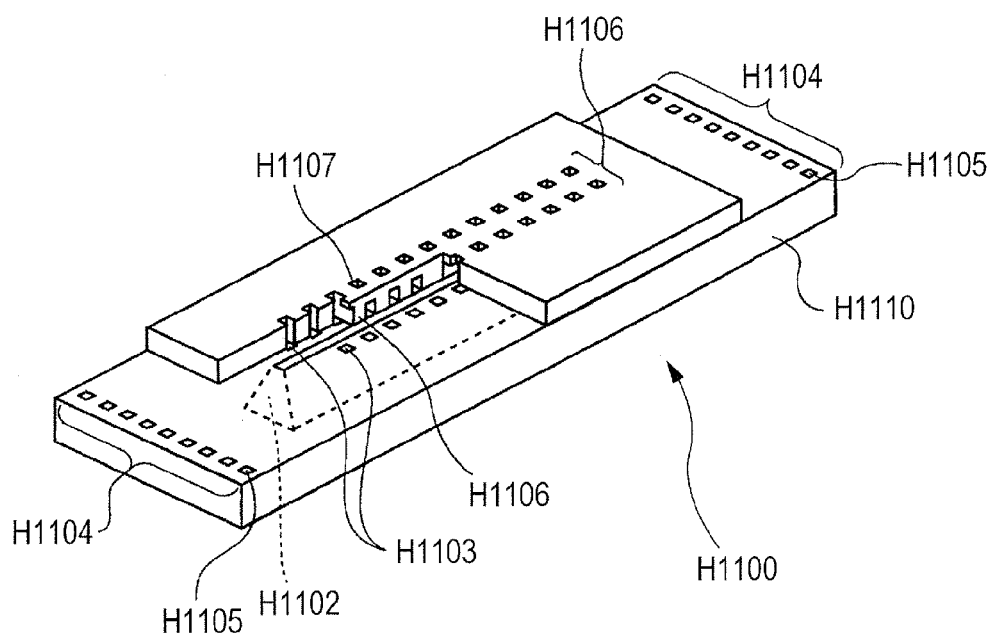
FIG. 7 is a schematic perspective view of a second substrate having energy generating elements of a liquid ejection head manufactured by a method according to the present invention.
Figure 8A:
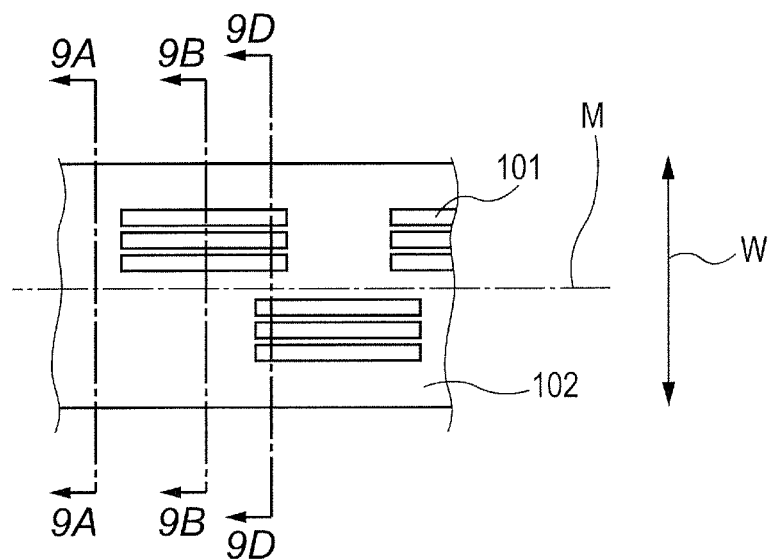
FIGS. 8A and 8B schematically illustrate a known technique of transferring liquid.
Figure 8B:
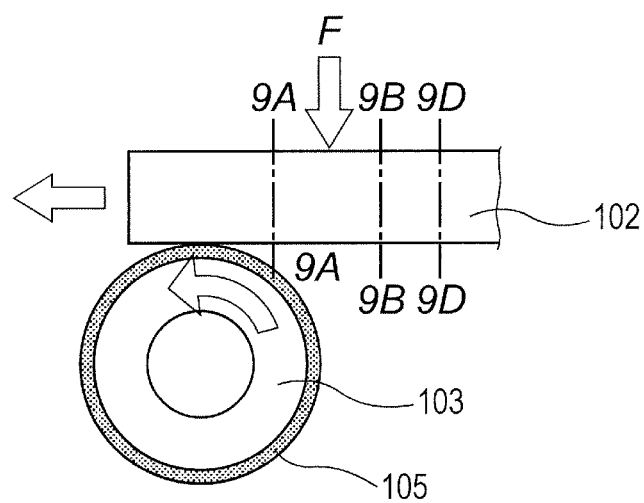
Figure 9A:
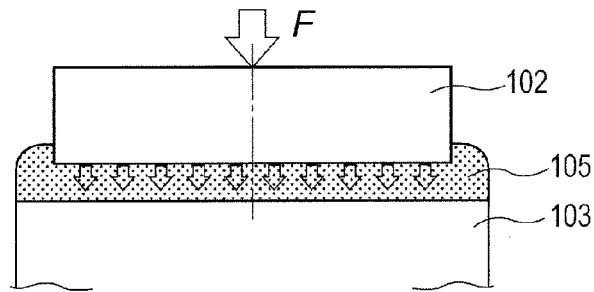
FIGS. 9A, 9B, 9C, 9D and 9E schematically illustrate a known technique of transferring liquid.
Figure 9B:
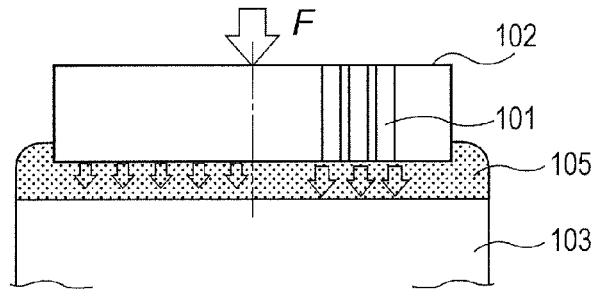
Figure 9C:
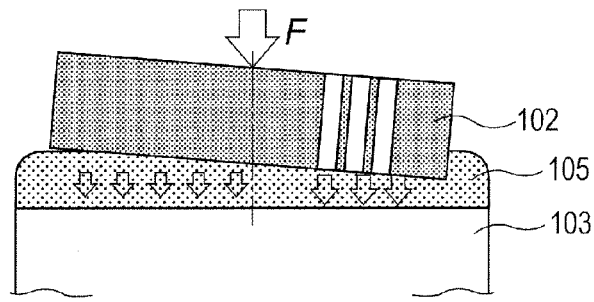
Figure 9D:
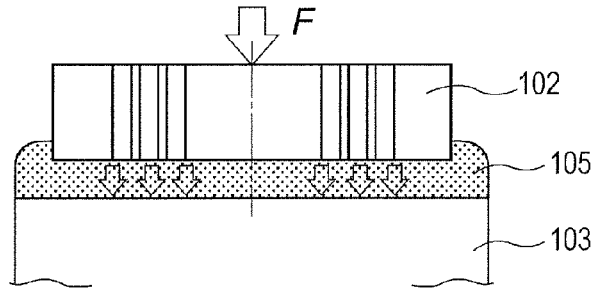
Figure 9E:
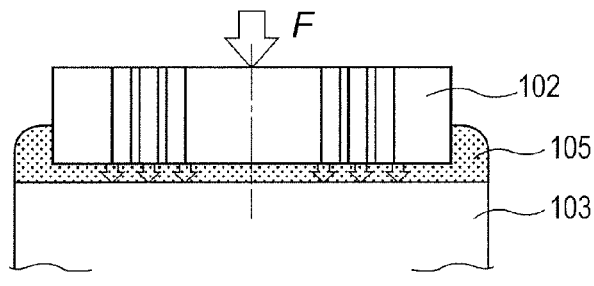

FIG. 7 is a partly cut-away schematic perspective view of the element substrate H1100 having energy generating elements. As illustrated in FIG. 7, the element substrate H1100 is typically formed by using an about 0.5 mm to 1 mm-thick Si substrate H1110. The element substrate H1100 has a supply port H1102 that is an aperture of a long groove shape operating as flow channel and formed in the Si substrate H1110 by means of anisotropic etching, sand-blasting or some other technique, utilizing the crystal orientation of Si.

In FIG. 7, two rows of electro-thermal conversion elements H1103, or energy generating elements, are arranged oppositely relative to the supply port H1102 in the Si substrate H1110. Additionally, electric wiring (not illustrated) is formed typically by means of Al in the Si substrate H1110 for the purpose of supplying electric power to the electro-thermal conversion elements H1103. The electro-thermal conversion elements H1103 and the electric wiring can be formed by utilizing a known film forming technique.

The electro-thermal conversion elements H1103 of the two rows are arranged in a zigzag manner. In other words, the ejection ports of the electro-thermal conversion elements of one of the rows are displaced from those of the electro-thermal conversion elements of the other row in the direction orthogonal to the running direction of the rows so that none of the ejection ports of the former row is aligned with any of the ejection ports of the latter row in that direction.

In the element substrate H1100 having electro-thermal conversion elements H1103, the liquid supplied from the supply port H1102 is ejected from the ejection ports 1107 that correspond to the respective electro-thermal conversion elements H1103 under the pressure of the bubbles generated by the heat emitted from the electro-thermal conversion elements H1103.

(1-2) Flexible Wiring Member H1300

The flexible wiring member H1300 is provided with an electric signal path to be used to apply an electric signal for ejecting liquid to the element substrate H1100 having electro-thermal conversion elements H1103. The flexible wiring member H1300 includes a base member made of polyimide and a wiring pattern made of copper foil and formed on the base member.

The flexible wiring member H1300 also has an aperture for receiving the element substrate H1100 having electro-thermal conversion elements H1103 at the time of assemblage. An electrode section is formed near an edge of the aperture at the position corresponding to the electric connected terminal section H1104 of the element substrate H1100 having electro-thermal conversion elements H1103.

The flexible wiring member H1300 additionally has an external signal input terminal for receiving electric signals from the apparatus main body. The external signal input terminal and the electrode section is linked to each other by the continuous wiring pattern made of copper foil.

(1-3) Base plate H1500

The base plate H1500 is typically made of a ceramic material. The base plate H1500 has supply ports 1 that are grooves arranged at a downstream part of the flow channel to supply liquid to the substrate H1100 having electro-thermal conversion elements H1103.

The base plate H1500 also has surface area adjusting recesses 11 for reducing the surface area thereof. The adhesive agent H1600 to be used to bond the substrate H1100 and the base plate H1500 to each other preferably has a low viscosity level and a low curing temperature, and cures in a short period of time so as to represent a relatively high hardness after curing and ink-resistance. Examples of the adhesive agent H1600 include thermo-setting adhesive agents containing epoxy resin as main ingredient. When a thermosetting adhesive agent is employed for the adhesive agent H1600, the thickness of the adhesive layer is preferably about 10 μm.

Additionally, part of the rear surface of the flexible wiring member H1300 is bonded and rigidly held to the flat peripheral area of the bonding surface of the element substrate H1100 having electro-thermal conversion elements H1103.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-265968, filed Dec. 5, 2011, which is hereby incorporated by reference herein in its entirety.

What is claimed is:

1. A method of manufacturing a liquid ejection head comprising the steps of:
   preparing a first substrate having a surface provided with flow channels for supplying liquid formed as recesses or through-grooves and a second substrate provided with energy generating elements for generating energy to be utilized to eject liquid;
   transferring transfer liquid onto the surface of the first substrate in a predetermined direction by means of a roller-shaped transfer body; and
   bonding the first substrate and the second substrate together by way of the transfer liquid;
   the transfer body contacting the first substrate substantially by a same and equal distance by way of the transfer liquid in a direction orthogonal relative to the predetermined direction in the step of transferring transfer liquid.

2. The method according to claim 1, wherein the region where the transfer body and the first substrate contact each other by way of the transfer liquid is symmetrical relative to the center line running in parallel with the transfer direction.

3. The method according to claim 1, wherein the first substrate has surface area adjusting recesses on the surface thereof.

4. The method according to claim 1, wherein the surface area adjusting recesses do not supply any liquid.

5. The method according to claim 1, wherein the surface area adjusting recesses have a depth greater than the thickness of the transfer liquid applied to the peripheral surface of the transfer body.

6. The method according to claim 1, wherein the transfer liquid is applied to the first substrate so as not to fill the surface area adjusting recesses with any of the transfer liquid.

7. A method of manufacturing a liquid ejection head comprising the steps of:
   preparing a first substrate having a surface provided with flow channels for supplying liquid formed as recesses or through-grooves and adjusting sections formed as recesses or through-grooves not to be used for supplying liquid, and a second substrate provided with energy generating elements for generating energy to be utilized to eject liquid;
   transferring transfer liquid onto the surface of the first substrate in a predetermined direction by means of a roller-shaped transfer body; and
   bonding the first substrate and the second substrate together by way of the transfer liquid;
   the flow channels and the adjusting sections being arranged on the surface of the first substrate in juxtaposition in a direction orthogonal relative to the predetermined direction.

8. The method according to claim 7, wherein the flow channels and the adjusting sections are arranged in juxtaposition relative to the predetermined direction on the surface of the first substrate.

9. The method according to claim 8, wherein the flow channels and the adjusting sections are arranged alternately relative to the predetermined direction on the surface of the first substrate.

10. The method according to claim 7, wherein the adjusting sections have a depth smaller than the depth of the flow channels.

* * * * *